May 8, 1928.
J. BUCKLEY
FULL HYDRAULIC BRAKE
Filed April 4, 1927    2 Sheets-Sheet 1
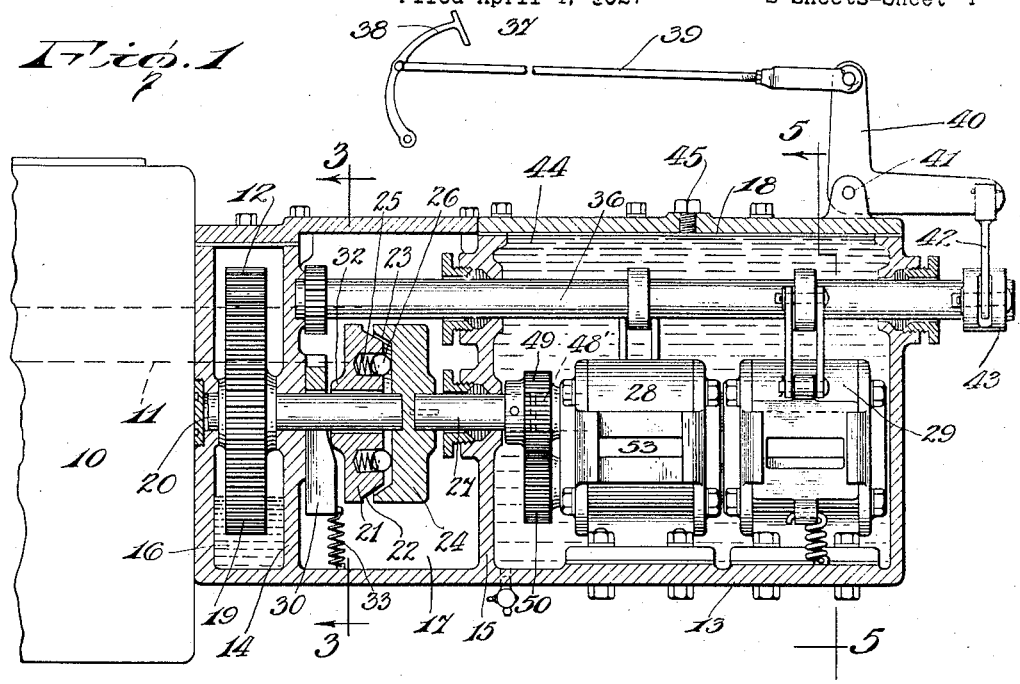
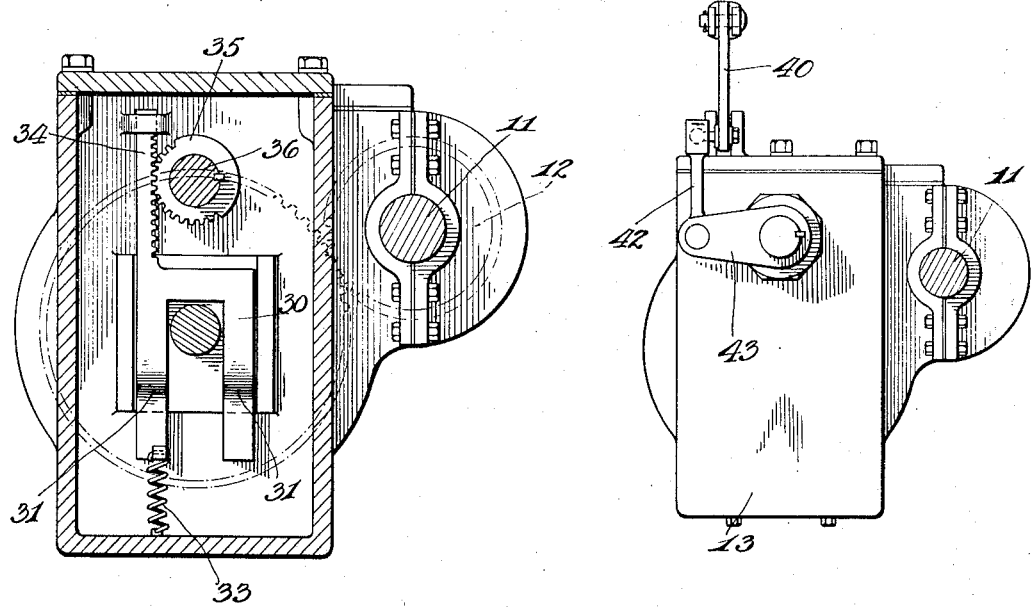
JOHN BUCKLEY
INVENTOR
BY Victor J. Evans
ATTORNEY
WITNESS:

May 8, 1928.  1,669,325
J. BUCKLEY
FULL HYDRAULIC BRAKE
Filed April 4, 1927   2 Sheets-Sheet 2
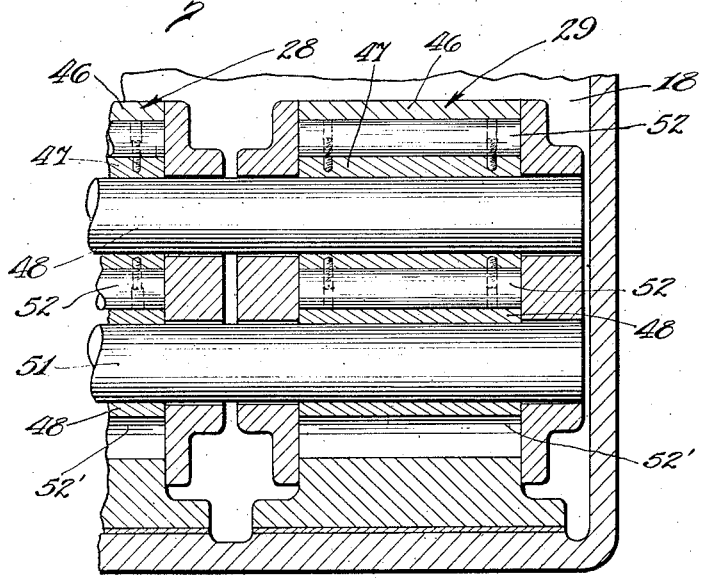
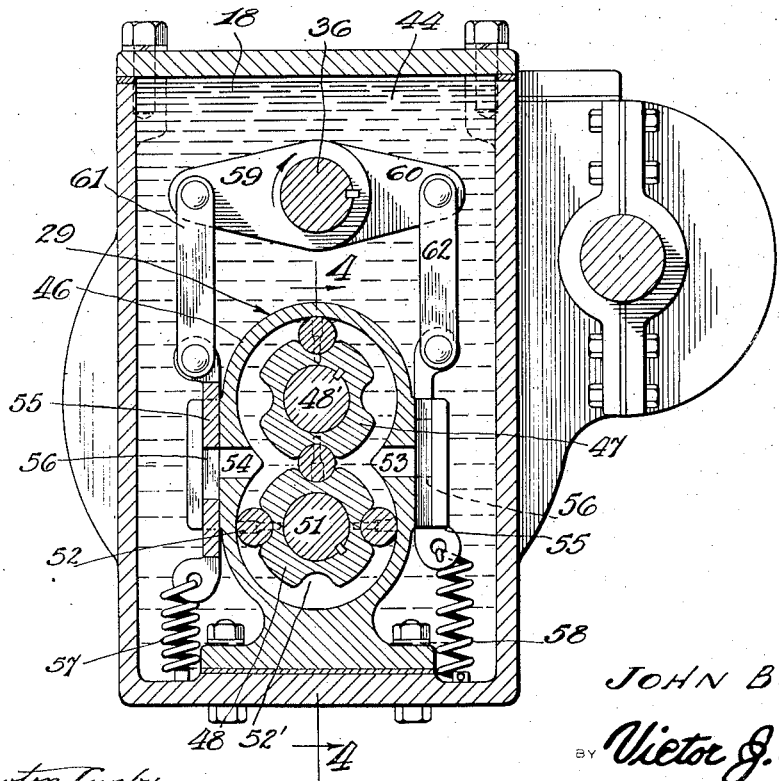
JOHN BUCKLEY
INVENTOR
BY *Victor J. Evans*
ATTORNEY Patented May 8, 1928.

1,669,325

UNITED STATES PATENT OFFICE.

JOHN BUCKLEY, OF BROOKLYN, NEW YORK.

FULL HYDRAULIC BRAKE.

Application filed April 4, 1927. Serial No. 180,962.

This invention relates to improvements in braking apparatus and has particular reference to a full hydraulic brake.

The primary object of the invention resides in a means for effecting the gradual reduction of speed or the complete stoppage of a moving vehicle such as an automobile, or other piece of machinery, by interrupting the outward flow of liquid through suitable hydraulic pumps, whereby to eliminate the use of brake bands and brake drums now commonly used for this purpose and which have been proven unsatisfactory for many reasons.

Another object of the invention is the provision of a full hydraulic brake which is normally disposed in an inoperative position and which is automatically operated by a driven part such as the drive shaft of a motor vehicle upon actuation of a foot pedal, irrespective of the direction of rotation of said shaft.

Another object of the invention is to provide a full hydraulic brake which costs less to maintain and operate than the previous forms of brakes and is more positive in its operation.

With these and other objects in view, the invention resides in certain novel construction and combination and arrangement of parts, the essential features of which are hereinafter fully described, are particularly pointed out in the appended claims, and are illustrated in the accompanying drawing, in which:

Figure 1 is a vertical longitudinal sectional view through my improved full hydraulic brake and showing the same in use in connection with the drive shaft of an automobile.

Figure 2 is an end elevation of the device.

Figure 3 is a vertical transverse sectional view on the line 4—4 of Figure 1.

Figure 4 is a fragmentary vertical sectional view on the line 4—4 of Figure 5.

Figure 5 is a vertical transverse sectional view on the line 5—5 of Figure 1.

Although my invention is shown in the drawings, and will be described in the specification as applied to an automobile, I wish it to be understood that the same may be adapted for use for many other purposes such as in connection with electric cars, steam cars and to any moving vehicle or piece of machinery providing there is a part to be brought to a stop or a part which is to be controlled to rotate at various speeds, such as for instance, in checking the speed of newspaper rolls that feed newspaper presses and which require instant stoppage of a part with the stoppage of the presses.

In the drawings, the reference numeral 10 designates the transmission housing of an automobile and through which the drive shaft 11 extends, which drive shaft carries a gear 12. Mounted adjacent the transmission housing is a casing 13 having spaced partitions 14 and 15 therein and which divide the casing into a gear housing 16, a clutch housing 17 and a pump housing or reservoir 18. The gear 12, hereinbefore mentioned, is disposed within the housing 16 and constantly meshes with a larger gear 19, which latter gear is fixed to a stub shaft 20, journalled in one end of the casing 13 and in the partition 14. Slidably mounted on the free end of the stub shaft 20 is a driving clutch element 21, the inner face of which is provided with a bevelled portion 22 for frictional engagement with a similar shaped surface 23 provided in a driven clutch element 24. The co-acting surfaces 22 and 23 of the respective clutch elements are normally held in spaced relation by springs 25 provided in recesses in the clutch element 21 and which springs act against balls 26 which bear against the inner face of the clutch element 24. The clutch element 24 is fixed to one end of a stub shaft 27 journalled in the partition 15 and which is disposed in axial alignment with the stub shaft 20 in order to rotate with the shaft 20 when the clutch elements are engaged for the purpose of operating a reverse hydraulic brake pump 28 and a forward hydraulic brake pump 29.

For the purpose of engaging the co-acting clutch elements to transmit motion from the shaft 20 to the shaft 27, I provide a yoke member 30, the legs of which straddle the shaft 20 and which legs are provided with cam surfaces 31 on their inner faces for engagement with a flange 32 provided on the outer face of the clutch element 21. The yoke member is normally held in a lowered position by reason of a contractile spring 33 but is movable to a raised position by the use of a rack bar 34 which rises from the yoke member and with which a gear segment 35 constantly meshes. The gear segment 35 is fixed adjacent one end of a rocker shaft 36, which rocker shaft is journalled in one end wall of the casing 13 and in the partitions 14 and 15.

For the purpose of imparting movement to the rocker shaft 36 against the action of the spring 33, I provide a foot actuated mechanism 37 which includes a foot brake pedal 38 to which one end of a rod 39 is connected, while the opposite end of the rod 39 is pivotally connected with one arm of a bell crank lever 40, which lever is pivotally mounted upon the casing 13 as at 41. Pivotally connected to the other arm of the bell crank is a link 42, which link connects with an arm 43 fixed to the outer end of the rocker shaft 36. Normally, the arm 43 extends in a horizontal position in order that the rocker shaft may be actuated in a clockwise direction to cause the gear segment 35 to lift the yoke 30 in an upward direction and whereby the spring 33 will automatically return the yoke to its lowered position upon the release of the foot brake pedal 38.

The pumps 28 and 29, hereinbefore mentioned, are immersed in the compartment 18 which is filled with a liquid such as oil 44 and which completely fills the compartment for a purpose now to be explained. The compartment is filled through a removable plug or cap 45 whereby any evaporation or loss of the liquid may be replaced as desired by unscrewing the cap 45 and pouring the fluid therethrough. Each pump 28 and 29 comprises a casing 46 having rotors 47 and 48 journalled therein and which are disposed in vertical alignment with each other. The rotor 47 of each pump is fixedly mounted on a stub shaft 48' which is disposed in axial alignment with the stub shaft 27 and which is joined therewith through a gear 49, which gear constantly meshes with a gear 50 carried by a shaft 51 to which the rotor 48 of the respective pumps are connected. The rotors of each pump are provided with diametrically opposed pistons 52 which are in the form of rollers, but which in reality do not roll as they are keyed in semi-circular recesses provided in the rotors and which mesh with concave recesses 52' of the adjacent rotor. Each pump is provided with an inlet port 53 in one of the side walls of the casing, but the inlet port of the pump 28 is disposed on the side opposite to the inlet port of the pump 29. Disposed opposite the inlet port of each pump is an outlet port 54 which is controlled by a gate valve 55 slidable vertically against the side of the casing, and which valve is provided with an opening 56 of a size slightly larger than the height of the outlet port 54, in order to permit of the exhaust of the oil from the casing, for a predetermined length of time during the upward movement of the gate valve before the valve fully acts to restrict the passage of the fluid therethrough. The gate valve 55 of the forward brake pump 29 is held down by means of a contractile spring 57, while an expansible spring 58 tends to normally hold the gate valve 55 of the reverse brake pump in an elevated position. Normally, the openings 56 in the gate valves are in register with the outlet ports, but gradually move to restrict the ports upon actuation of the rocker shaft 36 but which valves do not begin to actually close the outlet ports until after the clutch elements have been engaged.

Fixed to the rocker shaft 36 and extending in opposite directions therefrom, are arms 59 and 60 which are respectively connected to the gate valves of the pumps 28 and 29 through links 61 and 62 respectively. It will be appreciated that if the rocker shaft were actuated in the direction shown by the arrow in Figure 5, the arm 59 would tend to lift the gate valve 55 against the action of the spring 57 of the forward brake pump 29 and would move the gate valve 55 of the reverse brake pump 28 in a downward direction against the action of the expansible spring 58. The differences in size between the openings 56 and the exhaust ports 54 of the pumps is to permit of the slight movement of the rocker shaft in order to cause the gear segment 35 to lift the yoke 30 in order to cause the clutch elements to engage to start the pumps in operation. Should the drive shaft 11 be operating to drive the gear 12 in a forward direction, a counter-clockwise rotataion will be imparted to the rotors 47 of the respective pumps. The rotors 48 will turn in a clockwise direction due to the transmission of power from the shaft 27 to the shaft 51 through gears 49' and 50. However, should the drive shaft be turning in a reverse direction or counter-clockwise, the actuation of the rotors will be opposite to that just described.

In operation, in the event that it is desired to bring the drive shaft 11 to a gradual or complete stop, the foot pedal 38 is depressed which actuates the bell crank 43 causing the rocker shaft 36 to be turned a slight distance in order to lift the yoke 30 to force the clutch element 21 into clutching engagement with the clutch element 24 which starts the pumps in operation. During the rocking of the shaft, the gate valve 55 of the forward brake pump 29 has moved up and further depression of the brake pedal will cause the gradual restriction of the exhaust port 54 which sets up a back pressure against the pistons 52 of the respective rotors. It will be understood that the pistons suck in oil through the inlet port and force the same through the outlet port. It will be seen that if the port 54 is completely restricted or closed, the rotors will completely stop and which stopping is transferred through the shafts 27, 20, gear 19 to the gear 12 of the drive shaft. In the event that the automobile is moving backward and it is desired to bring the same to a stop, the pump 28 is actuated while the pump 29 is running idle as the said pump 29 will only set up a braking action when the drive shaft is turning in a counter-clockwise direction. The pump 28 performs the same function in setting up the braking action when the automobile is running backward as that performed by the pump 29 during the forward movement of the vehicle.

From the foregoing description, it will be seen that I have provided a hydraulic brake especially adapted for use on automobiles for gradually reducing the speed of the same and the eventual stopping of the vehicle and which is designed to eliminate the use of the present style brakes. It will be appreciated that my invention will eliminate "dragging brakes" which is present in the friction style brake which necessitates the consummation of power to overcome the drag of brake bands. There will also be an absence of squeaking and shrinking of the brakes when applied. Furthermore, there will be an absence of the inefficiency as exemplified in the present type of friction brakes due to snow, rain, ice, slush and other weather conditions, for when friction brakes become coated or glazed, they do not have the braking power which is necessary for the safety of the occupants of a motor vehicle. My invention will also eliminate the periodical renewal of brake bands which become glazed and worn out with the resulting lay up of the car for such purposes and the further difficulties experienced in breaking in newly installed brake bands. There will also be an absence of shock due to the checking of the momentum in driving down grades which results from the throwing in of the gears as in many instances it is not safe to rely solely upon the brakes of the car when descending a hill.

Although I have specifically mentioned that oil is to be used in connection with my invention, I wish it to be understood that the fluidity or viscosity of the hydraulic agent may be varied. It is sought in the general way to employ an anti-freeze liquid, but any agent may be used which is capable of producing the best results.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a driven rotatable shaft, a forward hydraulic brake pump, a reverse hydraulic brake pump, individual valve means for controlling the exhaust of liquid from the respective brake pumps, pump driving means operable by said driven rotatable shaft but normally disconnected therewith, clutch means, and manually operable means for successively operating said clutch means to operatively connect said pump driving means with said driven rotatable shaft, and for actuating said individual valve means to gradually restrict the flow of liquid through either of the hydraulic pumps and for eventually closing the flow therethrough depending upon the direction of rotation of said driven rotatable shaft, substantially as and for the purpose specified.

2. In a device of the class described, the combination of a driven rotatable shaft, a reservoir filled with liquid, a forward hydraulic brake pump disposed in said reservoir, a reverse hydraulic brake pump disposed in said reservoir, the operation of the respective hydraulic pumps being responsive to the clockwise and counter-clockwise rotation of said driven rotatable shaft, pump driving means for simultaneously operating said hydraulic pumps but normally disposed in an inoperative condition, clutch means, and manually operable means for successively actuating said clutch means to operatively connect said pump driving means with said driven rotatable shaft and for gradually decreasing the flow of liquid through either of said pumps and for eventually stopping said pumps depending upon the direction of rotation of said driven rotatable shaft, substantially as and for the purpose specified.

3. In a full hydraulic brake apparatus, a liquid reservoir, a forward hydraulic brake pump and a reverse hydraulic brake pump, each pump having an inlet port and an outlet port, pump driving means for actuating said pumps simultaneously, individual valve means for controlling the flow of liquid through the respective outlets and normally disposed in an open position to permit of the free exhaust of the liquid through said outlet, and manual control means for actuating the individual valve means to gradually restrict the flow of liquid through the respective outlets.

4. In a full hydraulic brake apparatus, a casing adapted to be filled with a liquid substance, a forward hydraulic brake pump and a reverse hydraulic brake pump mounted within said casing, a rocker shaft journalled within said casing above said pumps, each of said pumps having an inlet port and an outlet port disposed on opposite sides thereof, the inlet port and outlet port of one pump being disposed opposite to the inlet and outlet port of the other pump, vertically slidable valves having openings therein normally in register with said outlet ports, rocker arms extending from opposite sides of the axis of said rocker shaft, and being connected to the respective valves by links, pump driving means, and means for actuating said rocker shaft to move said valves to cause the same to gradually restrict the flow of liquid therethrough and for eventually shutting off the flow.

5. In a full hydraulic brake apparatus, a casing adapted to be filled with a liquid substance, a forward hydraulic brake pump and a reverse hydraulic brake pump mounted within said casing, a rocker shaft journalled within said casing above said pumps, each of said pumps having an inlet port and an outlet port disposed on opposite sides thereof, the inlet port and outlet port of one pump being disposed opposite to the inlet and outlet port of the other pump, vertically slidable valves having openings therein normally in register with said outlet ports, rocker arms extending from opposite sides of the axis of said rocker shaft and being connected to the respective valves by links, pump driving means, means for actuating said rocker shaft to move said valves to cause the same to gradually restrict the flow of liquid therethrough and for eventually shutting off the flow, and means operable by said rocker shaft for rendering said pump driving means operative.

6. In a full hydraulic brake apparatus, a casing adapted to be filled with a liquid substance, a forward hydraulic brake pump and a reverse hydraulic brake pump mounted within said casing, a rocker shaft journalled within said casing above said pumps, each of said pumps having an inlet port and an outlet port disposed on opposite sides thereof, the inlet port and outlet port of one pump being disposed opposite to the inlet and outlet port of the other pump, vertically slidable valves having openings therein normally in register with said outlet ports, rocker arms extending from opposite sides of the axis of said rocker shaft and being connected to the respective valves by links, pump driving means, means for actuating said rocker shaft to move said valves to cause the same to gradually restrict the flow of liquid therethrough and for eventually shutting off the flow, and means operable by said rocker shaft for rendering said pump driving means operative, said last means including a driven shaft, a sliding clutch element thereon, a co-acting clutch element constituting part of said pump driving means, means for normally holding said sliding clutch element and of clutching engagement with said other clutch element, a sliding cam member having a rack bar, and a gear segment carried by said rocker shaft and engaging said rack bar whereby to lift said cam member to cause the same to move said sliding clutch element into engagement with said other clutch element.

7. In a full hydraulic brake apparatus, a casing adapted to be filled with a liquid substance, a forward hydraulic brake pump and a reverse hydraulic brake pump mounted within said casing, a rocker shaft journalled within said casing above said pumps, each of said pumps having an inlet port and an outlet port disposed on opposite sides thereof, the inlet port and outlet port of one pump being disposed opposite to the inlet and outlet port of the other pump, vertically slidable valves having openings therein normally in register with said outlet ports, rocker arms extending from opposite sides of the axis of said rocker shaft and being connected to the respective valves by links, pump driving means, means for actuating said rocker shaft to move said valves to cause the same to gradually restrict the flow of liquid therethrough, and for eventually shutting off the flow, means operable by said rocker shaft for rendering said pump driving means operative, said last means including a drive shaft, a sliding clutch element thereon, a co-acting clutch element constituting part of said pump driving means, means for normally holding said sliding clutch element and of clutching engagement with said other clutch element, a sliding cam member having a rack bar, a gear segment carried by said rocker shaft and engaging said rack bar whereby to lift said cam member to cause the same to move said sliding clutch element into engagement with said other clutch element, and automatic means for returning said cam element to normal position to permit disengagement of said clutch element upon the release of said actuating means.

In testimony whereof I have affixed my signature.

JOHN BUCKLEY.